United States Patent
Ito et al.

(10) Patent No.: US 9,580,000 B2
(45) Date of Patent: Feb. 28, 2017

(54) SEAT BACK FOR VEHICLES

(71) Applicants: TOYO SEAT CO., LTD., Osaka (JP); JSP CORPORATION, Tokyo (JP)

(72) Inventors: Hiroyuki Ito, Kaito-cho (JP); Takashi Imai, Takehara (JP); Hidehiro Sasaki, Kanuma (JP); Seishiro Murata, Tokyo (JP); Satoru Shioya, Kanuma (JP)

(73) Assignees: TOYO SEAT CO., LTD., Osaka (JP); JSP CORPORATION, Tokyo (JP)

( * ) Notice: Subject to any disclaimer, the term of this patent is extended or adjusted under 35 U.S.C. 154(b) by 157 days.

(21) Appl. No.: 14/307,397

(22) Filed: Jun. 17, 2014

(65) Prior Publication Data

US 2014/0312676 A1 Oct. 23, 2014

Related U.S. Application Data

(63) Continuation of application No. PCT/JP2012/083002, filed on Dec. 20, 2012.

(30) Foreign Application Priority Data

Dec. 21, 2011 (JP) .................................. 2011-280300
Mar. 29, 2012 (JP) .................................. 2012-076264

(51) Int. Cl.
*B60N 2/64* (2006.01)
*B60N 2/68* (2006.01)
*B60N 2/70* (2006.01)

(52) U.S. Cl.
CPC ............... *B60N 2/64* (2013.01); *B60N 2/643* (2013.01); *B60N 2/68* (2013.01); *B60N 2/686* (2013.01); *B60N 2/7094* (2013.01)

(58) Field of Classification Search
USPC ............................ 297/452.63, 452.46, 452.42
See application file for complete search history.

(56) References Cited

U.S. PATENT DOCUMENTS 1,886,308 A * 11/1932 Schultes ................. A47C 7/024
 297/285
3,565,482 A * 2/1971 Blodee .................... A47C 7/14
 297/284.3

(Continued)

FOREIGN PATENT DOCUMENTS

FR 2947775 A1 1/2011
JP 47-1972-35047 Y1 10/1972

(Continued)

OTHER PUBLICATIONS

European Search Report, Application No./Patent No. 12858799.5—1758/2796316 PCT/JP2012083002 Notice was issued on Apr. 29, 2015, Date of completion of the search: Apr. 20, 2015.

*Primary Examiner* — David E Allred
(74) *Attorney, Agent, or Firm* — Tracy M. Heims; Apex Juris, pllc.

(57) ABSTRACT

A seat back for vehicles including a seat back pad having supporting bodies fixed on a periphery of an opening or a seat frame, or formed integrally with the periphery of the opening by one or multiple-point support, the supporting bodies aligned at predetermined intervals, each arranged in a direction between periphery portions opposite to each other of the opening at a front surface portion formed as a backrest surface for a seated person, the supporting bodies being independent of each other in rod or plate form, each made of a synthetic resin foam having 20 mm or larger in bending deflection amount and 2 to 100 N in load when deflected by 20 mm measured in accordance with a method defined by JIS K7221-2:2006, and having an interspace portion configured such that the supporting bodies are allowed to be deformed by bending in a rear direction.

4 Claims, 13 Drawing Sheets

B-B SECTION

(56) References Cited

U.S. PATENT DOCUMENTS

| | | | | |
|---|---|---|---|---|
| 3,574,401 A * | 4/1971 | Lehner | A47C 31/00 297/308 |
| 3,632,170 A * | 1/1972 | Witt | A47C 4/022 297/440.14 |
| 3,681,797 A * | 8/1972 | Messner | A47C 21/046 297/180.13 |
| 3,713,696 A * | 1/1973 | Dudley | B60N 2/64 297/452.26 |
| 3,819,232 A * | 6/1974 | Wagner | B60N 2/686 297/452.16 |
| 3,833,260 A * | 9/1974 | Harder, Jr. | A47C 7/18 264/46.4 |
| 3,861,747 A | 1/1975 | Diamond | |
| 3,924,893 A * | 12/1975 | Ferrara | B60N 2/686 297/452.34 |
| 4,052,104 A * | 10/1977 | Noss | A47C 7/185 297/452.17 |
| 4,164,356 A * | 8/1979 | Knight | A47C 1/028 297/1 |
| 4,176,880 A * | 12/1979 | Marchello | B62J 1/00 297/195.1 |
| 4,383,342 A * | 5/1983 | Forster | A47C 7/405 297/284.1 |
| 4,798,414 A * | 1/1989 | Hughes | A47C 7/462 297/284.4 |
| 5,226,188 A * | 7/1993 | Liou | A47C 7/742 297/452.46 |
| 5,700,060 A * | 12/1997 | Bullard | A47C 7/24 297/452.5 |
| 5,816,661 A * | 10/1998 | Sakurai | A47C 7/14 297/452.46 |
| 6,082,825 A * | 7/2000 | Simon | A47C 7/35 267/101 |
| 6,164,726 A * | 12/2000 | Reeves | A47C 1/146 297/16.2 |
| 6,877,816 B1 * | 4/2005 | Farmont | A47C 1/143 297/284.1 |
| 7,320,503 B2 * | 1/2008 | Eysing | A47C 7/46 297/285 |
| 8,262,157 B2 * | 9/2012 | Novak | A47C 1/146 297/16.2 |
| 8,454,094 B1 * | 6/2013 | Boulware, Sr. | B60N 2/60 297/452.42 |
| 2010/0117433 A1 * | 5/2010 | Cassaday | A47C 7/40 297/452.46 |
| 2010/0171346 A1 | 7/2010 | Laframboise et al. | |
| 2014/0312676 A1 | 10/2014 | Ito | |

FOREIGN PATENT DOCUMENTS

| | | |
|---|---|---|
| JP | 58-1983-90157 | 6/1983 |
| JP | 601985-117749 | 8/1985 |
| JP | 61-1986-190252 | 11/1986 |
| JP | 2001-204579 A | 7/2001 |
| JP | 2002-28044 A | 1/2002 |
| JP | 4009490 B2 | 11/2003 |
| JP | 2005-46425 A | 2/2005 |
| JP | 2009-268780 A | 11/2009 |
| JP | 2010142530 A | 7/2010 |
| JP | 2011-92546 A | 5/2011 |
| JP | 2011-522602 A | 8/2011 |
| JP | 06-1994-72199 A | 6/2014 |

\* cited by examiner

B-B SECTION

A-A SECTION

B-B SECTION

A-A SECTION

A-A SECTION

A-A SECTION

DISPLACEMENT AMOUNT (mm)

DISPLACEMENT AMOUNT (mm)

SEAT BACK FOR VEHICLES

CROSS REFERENCE TO RELATED APPLICATIONS

This is a continuation application of International Patent Application No. PCT/JP2012/083002 filed on Dec. 20, 2012 claiming priority upon Japanese Patent Application Nos. 2011-280300 and 2012-076264 filed on Dec. 21, 2011 and Mar. 29, 2012, respectively, of which full contents are incorporated herein by reference.

BACKGROUND OF THE INVENTION

Field of the Invention

The present invention relates to the weight reduction of a seat back for vehicles, and relates to the seat back for vehicles characterized in being excellent in recyclability, fitting feeling, and cushioning properties, in particular.

Description of the Background Art

The seat back for vehicles generally included a metal seat frame or wire, and had an urethane foam used generally as a cushion material, and further had the entire surface thereof covered with a vehicle seat cover. The load of an occupant was supported mainly by deflecting an urethane foam layer interposed between the seat frame or wire and the vehicle seat cover in a compression direction. The cushioning properties and fitting feeling were obtained mainly by reaction force, restoring force, and deflection when the urethane foam layer was deflected in a compression direction.

Furthermore, regarding one technique of the weight reduction of a seat back for vehicles described in Patent Document 1, a seat frame exhibiting a frame shape and having a mountain shape in cross section had an inclined surface corresponding to one side of such a mountain shape at an inner periphery of the frame shape as well as facing a seated person. The seat frame was covered with a net having elasticity whose peripheral portion was drawn over the top of the mountain shape and fixed on the other side of the mountain shape so as to form a seating surface having a concave surface shape. An angle was provided between the net and the inclined surface of the seat frame.

Regarding another technique of the weight reduction described in Patent Document 2, a seat for vehicles included a seating portion having a base plate arranged on a seat frame in an attachable and detachable fashion, a block arranged on the base plate, a spring plate arranged on the block, and a vehicle seat cover covering the spring plate. The block was arranged to form a predetermined space between the base plate and the spring plate. The spring plate was formed of a foam having elasticity made of any of a PP (polypropylene) bead foam, a PE (polyethylene) bead foam, a PP foam; a PE foam, an AS resin (acrylonitrile/styrene resin) foam, EVA (ethylene-vinyl acetate copolymer resin), and an urethane foam material, and the spring plate was deflected to the predetermined space when force in a direction toward the base plate was applied.

PRIOR ART DOCUMENTS

Patent Documents

Patent Document 1: Japanese Patent Application Publication No. 2002-28044

Patent Document 2: Japanese Patent No. 4009490

Problems to be Solved

The urethane foam has been used as a cushioning material in the conventional general seat back for vehicles. The urethane foam is extremely high in cushioning properties and excellent in comfort, and therefore has still been used frequently. There has been a problem, however, that the urethane foam is inferior in recyclability. Furthermore, the seat back for vehicles has been required to have not only general cushioning properties but also a function of supporting a body of an occupant at an optimal position relative to acceleration in longitudinal and lateral directions applied to the occupant with movement of a vehicle. It has been necessary to support the body at an optimal position to reduce tiredness due to long-time riding. Only the very lightweight and flexible urethane foam could not therefore satisfy the function, and the urethane foam has needed to have a certain density or higher to obtain a certain rigidity. This has caused a problem that the weight reduction does not progress.

In the technique disclosed in Patent Document 1, the net material for supporting a load of an occupant has been drawn in the seat frame arranged around the seat back and securely fixed, and the load applied by seating of the occupant has finally been supported by rigidity of the seat frame through the net material. The structure of the seat frame has therefore needed to have a certain strength or higher. As a result, there has been a problem that, in spite of the light weight of the net material itself as the conventional cushion material, the weight of the seat frame tends to be increased, and the weight reduction effect as a whole is not sufficient.

Further, the cushioning properties of the net material have been obtained mainly by elongation of the material, and therefore limited. A slack has occurred due to long-time use, which has tended to deteriorate marketability. Still further, the structure has been configured such that a flat net material is extended over the seat frame, and therefore, the basic form of the seat back is flat. It has therefore been difficult to obtain a three-dimensional shape necessary to support a body of an occupant at an optimal position, which has consequently caused a problem of discomfort for the occupant. This has been because an instable hammock-form net material could not stably support the body of the occupant when a lateral G has been applied to the occupant due to movement of a vehicle, for example.

Next, in the technique of Patent Document 2, the spring plate has been a plate-like foam exhibiting a substantially rectangular shape, and a plurality of lateral grooves have been formed on the occupant-seated side of the spring plate. When the grooves are shallow, however, flexibility could not be provided. On the other hand, when the grooves are deep, excessive tensile force has been concentrated on a slightly remaining connection part at the bottom of the groove at a time when the cushion material is deflected, which causes large elongation deformation. As a result, it has been highly possible to cause unrestorable permanent deformation or rupture. When even one part of the connection part at the groove is broken, the support has been lost at once and apparent hardness of the entire cushion material has been reduced rapidly, which has significantly deteriorated the function as a cushion material. Therefore, it has been actually difficult to design deflection of a cushion material to be a certain amount or larger in order to avoid breakage, and difficult to provide sufficient fitting feeling and comfort when seated.

Furthermore, regarding the technique described in Patent Document 2, it has been possible to obtain individually favorable seating feeling by appropriately selecting blocks different in height depending upon a body built of an occupant. There has been a problem, however, that an occupant needs to change, before seated, the blocks to ones having a height appropriate to the occupant depending upon lightness or heaviness of his/her weight, which is the operation actually difficult to perform.

SUMMARY OF THE INVENTION

Hence the object of the present invention is to provide a seat back for vehicles that is: excellent in fitting feeling and cushioning properties when an occupant is seated; capable of achieving the weight reduction; and excellent in recyclability.

Means for Solving Problems

In the present invention, the synthetic resin foam is indicative of a synthetic resin foam molding that is flexible to be bending-deformed and excellent in restoration properties. The bending deflection thereof measured in accordance with the method defined by Japanese Industrial Standards (JIS) K7221-2:2006 (in the atmosphere of 23±2° C. and relative humidity of 50±5%, a test specimen whose skin is removed having a length of 350 mm, a width of 100 mm, and a thickness of 25 mm is subjected to a load applied at a test speed 20±1 mm/min with a distance between supporting points of 300 mm until the deflection reaches 90 mm at the maximum, during which the load deflection curve is recorded) is larger than or equal to 20 mm, and the load when deflected by 20 mm is 2 to 100 N. More specifically, the synthetic resin foam is indicative of a polypropylene foam, a polyethylene foam, other polyolefin resin foams, a modified polystyrene resin foam, or the like. The synthetic resin foam contains a bead foam molding exemplified by a polypropylene bead foam molding, a polyethylene bead foam molding, and the like.

More specifically, one preferable material to be selected is the material whose sample can be restored from deformation by higher than or equal to 90% after the test of: a rod-form or plate-form test specimen of the sample having a length of approximately 400 mm is held at both ends thereof while the center of the test specimen of the sample being pressed down about 25 mm by a load for 30 minutes; and thereafter the load is released. Alternatively, another preferable material to be selected is the material whose sample has the residual distortion (also referred to as "residual displacement amount") measured to be smaller than or equal to a predetermined amount after the test of: the center portion of the sample held at both ends thereof is pressed down repetitively a predetermined number of times and deformed in accordance with the test conventionally performed for the seat back made of an urethane foam.

As material fulfilling such conditions, for example, a polypropylene foam with density of 0.06 g/cm$^3$ to 0.015 g/cm$^3$, and more preferably with density of 0.035 g/cm$^3$ to 0.015 g/cm$^3$, a polyethylene foam with density of 0.08 g/cm$^3$ to 0.03 g/cm$^3$, or the like are preferable. On the other hand, a hard urethane foam, a polystyrene foam, and the like, which are poor in flexibility and possibly ruptured easily due to bending deformation, are not favorable.

The present inventors have considered materials to achieve the weight reduction. As an example of the material capable of substituting an urethane foam having an open cell structure, the synthetic resin foam generally having a closed cell structure had the advantages of being light, excellent in rigidity, easy to recycle, and the like in comparison with the urethane foam conventionally and generally used as a cushion material for a seat back. When the deflection and restoring force in a compression direction were used for cushion, however, the reaction force tended to increase rapidly with deformation of the foam due to repulsive force of contained air. The synthetic resin foam is therefore inferior in comfort due to a lack of cushioning properties, which causes hard feeling.

Furthermore, when the synthetic resin foam generally having a closed cell structure was deflected in a compression direction and used as a cushion material, similarly to the urethane foam, such a synthetic resin gradually lost restoring force with long-time use, and creep occurred. This was caused mainly by fatigue due to repetitive deformation of a resin film constituting bubbles and reduction of pressure of contained air. The synthetic resin foam was therefore not favorable as material for a seat back for vehicles, which is used for a long time.

By analysis of the physical properties of the synthetic resin foam from various angles, the inventors have found that it is optimal to adopt the method using, for a cushion material, the bending deformation and restoration properties of supporting body 3 to be described later made of a synthetic resin foam capable of being bending-deformed and excellent in restoration properties, instead of the structure body, which has been used conventionally as a cushion material, to be deflected in a compression direction, and has achieved the present invention.

In order to solve the problems described in "Problems to be Solved," a seat back for vehicles 1 according to a first aspect of the present invention is characterized by comprising: a seat back pad 2, the seat back pad 2 having a plurality of supporting bodies 3 fixed on a periphery of an opening or a seat frame 7 of the seat back pad 2 by one-point support or multiple-point support, or formed integrally with the periphery of the opening by one-point support or multiple-point support, wherein the plurality of supporting bodies 3 are aligned at predetermined intervals, and each of the plurality of supporting bodies 3 is arranged in a direction between periphery portions opposite to each other of the periphery of the opening on the seat back pad 2 at a front surface portion thereof formed as a backrest surface for a seated person, and wherein the plurality of supporting bodies 3 are independent of each other in rod form or in plate form, and each of the plurality of supporting bodies 3 is made of a synthetic resin foam having larger than or equal to 20 mm in bending deflection amount and 2 to 100 N in load when deflected by 20 mm, both of which are measured in accordance with a method defined by JIS K7221-2:2006, and an interspace portion 5 configured such that the plurality of supporting bodies 3 are allowed to be deformed by bending in a rear direction therein.

The seat back for vehicles 1 according to a second aspect of the present invention is characterized in that the plurality of supporting bodies 3 have, in front view, a linear shape, a curved shape, or a bent shape formed by combination of straight lines bent with arbitrary angles in the first aspect of the present invention.

The seat back for vehicles 1 according to a third aspect of the present invention is characterized in that the seat back pad 2 further has a belt-form sub-supporting body 8 extended on the seat frame 7 on a rear side of the plurality of supporting bodies 3 in the first or second aspect of the present invention.

A seat back for vehicles 1 according to a fourth aspect of the present invention is characterized by comprising: a seat back pad 2 made of a synthetic resin foam, the seat back pad 2 constituted by sections including a front surface portion 15 formed as a backrest surface for a seated person, a side surface portion 17 having a right-side surface portion 17 and a left-side surface portion 17, and a rear surface portion 16 formed as a rear side of the seat back pad 2, the seat back pad 2 having a plurality of gaps 4 in slender shape in a substantially horizontal direction formed through the front surface portion 15, a plurality of supporting bodies 3 in rod form or in plate form interposed among the plurality of gaps 4 and the right/left-side surface portions 17, and aligned at predetermined intervals, and an interspace portion 5 formed in a center portion surrounded by the front surface portion 15, the side surface portion 17, and the rear surface portion 16, the interspace portion 5 configured such that the front surface portion 15 is allowed to be deformed by bending therein; and a vehicle seat cover 21 arranged to cover at least a surface of the seat back pad 2.

The seat back for vehicles 1 according to a fifth aspect of the present invention is characterized in that the seat back pad 2 further has a projecting portion 18 arranged on a rear side of the plurality of supporting bodies 3 in rod form or in plate form interposed between the right-side surface portion 17 and the left-side surface portion 17 in a substantially horizontal direction, or arranged on a front side of the rear surface portion 16 formed as the rear side of the seat back pad 2, the projecting portion 18 configured to contact the rear surface portion 16 of the seat back pad 2 or the supporting bodies 3 due to bending deformation of each of the plurality of supporting bodies 3 by a certain amount or larger, and to support a load of a seated person, when each of the plurality of supporting bodies 3 is deformed by bending under a load of a seated person in the fourth aspect of the present invention.

Any of the first to fifth aspects of the present invention is characterized in that the seat back for vehicles 1 contacted by a body of an occupant includes as an element the seat back pad 2 having: the plurality of supporting bodies 3 in rod or plate form fixed on or formed integrally with the periphery of the opening on the front surface portion 15 of the seat back pad 2 in such a fashion that the plurality of supporting bodies 3 are aligned at predetermined intervals (the plurality of gaps 4); and the interspace portion 5 configured such that the plurality of supporting bodies 3 are allowed to be deformed by bending in a rear direction therein, wherein the plurality of supporting bodies 3 and the like are made of the synthetic resin foam. The interspace portion 5 has one embodiment surrounded by faces of which at least one face has an opening, or another embodiment formed in a center portion surrounded by the front surface portion 15, the right/left-side surface portions 17, and the rear surface portion 16 of the seat back pad 2.

Advantageous Effects of the Invention

According to the seat back for vehicles 1 of any one of the first to fifth aspects of the present invention, the urethane foam used generally and conventionally can be substituted with the synthetic resin foam, which results in the weight reduction and the improvement in recyclability. Further, in spite of the use of the synthetic resin foam that is relatively hard and inferior in cushioning properties, fitting properties, and creep resistance properties, it is possible to provide the synthetic resin foam with high cushioning properties, high fitting properties, and high degree of freedom of design. A body of an occupant is therefore supported appropriately, thereby enabling the occupant to obtain high comfort. The favorable creep resistance properties equivalent to those of the conventional urethane foam are exerted even with long-time use, thereby exerting the effect of high marketability.

Still further, the processing costs can be decreased and the weight reduction can be promoted by forming integrally the plurality of supporting bodies 3 and other sections, which constitute the seat back pad 2, from the synthetic resin foam.

Furthermore, according to the seat back for vehicles 1 of the second aspect of the present invention, for a smaller-sized seat back disabling a sufficient distance between both ends of the supporting body 3 and a sufficient deflection by a load of a body of an occupant, the substantial distance when the supporting body 3 is bending-deformed can be increased by forming the supporting body 3 in a non-linear shape such as an arc shape or a bent shape formed by combination of straight lines bent with arbitrary angles, which results in the obtainment of sufficient deflection. The degree of freedom of design can therefore be enhanced.

Further, according to the seat back for vehicles 1 of the third aspect of the present invention, the plurality of supporting bodies 3 receiving the pressure of a seated person is bending-deformed in a rear direction, and after the bending deformation reaches a certain amount or larger, the rear side of the plurality of supporting bodies 3 contacts the sub-supporting body 8 extended on the seat frame 7, and after the contact, the supporting force can be improved by the reaction force due to the bending deformation of the plurality of supporting bodies 3 and the tension of the sub-supporting body 8, thereby preventing excessive sinking of the body of the seated person so as to support the body of the seated person at an appropriate position.

Still further, the components are only the plurality of supporting bodies 3 and the belt-form sub-supporting body 8, and therefore, the advantageous effects of downsizing the seat back for vehicles itself as well as reducing considerably its weight can be achieved in comparison with the case using an urethane foam material having a predetermined density and thickness to obtain the same cushioning properties relative to pressing force.

Furthermore, according to the seat back for vehicles 1 of the fourth aspect of the present invention having the configuration where the rear surface portion 16 is provided in addition to the front surface portion 15 and the right/left-side surface portions 17 instead of the belt-form sub-supporting body 8 in the seat back pad 2, the plurality of supporting bodies 3 receiving the pressure of a seated person is bending-deformed in a rear direction, and after the bending deformation reaches a certain amount or larger, the rear side of the plurality of supporting bodies 3 contacts the rear surface portion 16, and after the contact, the supporting force can be improved by the reaction force due to the bending deformation of the plurality of supporting bodies 3 and the reaction force due to the bending deformation of the rear surface portion 16, thereby preventing excessive sinking of the body of the seated person so as to support the body of the seated person at an appropriate position.

Furthermore, according to the seat back for vehicles 1 of the fifth aspect of the present invention, the plurality of supporting bodies 3 receiving the pressure of a seated person is bending-deformed in a rear direction, and after the bending deformation reaches a certain amount or larger, the rear side of the plurality of supporting bodies 3 contacts the rear surface portion 16, and upon the contact, the projecting portion 18 provided on the plurality of supporting bodies 3 or the rear surface portion 16 is compressed first, and therefore, the advantageous effects of suppressing butting feeling of the plurality of supporting bodies 3 against the rear surface portion 16 can be achieved.

BRIEF DESCRIPTION OF THE DRAWINGS

For more thorough understanding of the present invention and advantages thereof, the following descriptions should be read in conjunction with the accompanying drawings, in which.

DESCRIPTION OF EMBODIMENTS OF THE INVENTION

Figure 1:
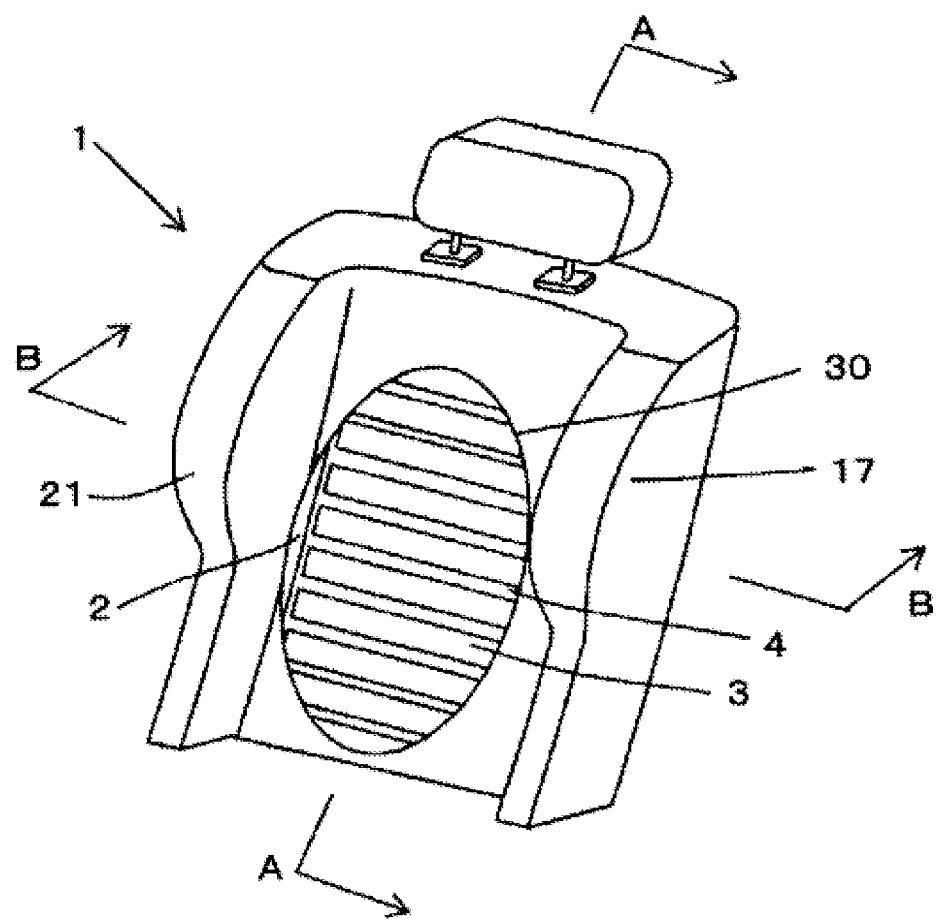
FIG. 1 depicts a schematic view of a seat back for vehicles according to the first aspect of the present invention.

In the following, the embodiments of a seat back for vehicles 1 according to the present invention will be described.

As illustrated in FIG. 1 to FIG. 10, the seat back for vehicles 1 according to the present invention is the seat back for vehicles 1 including the seat back pad 2, in which an opening portion is provided at the front surface portion 15 of the seat back pad 2 on which a backrest surface for a seated person is formed, the plurality of independent rod-form or plate-form supporting bodies 3 that are made of a synthetic resin foam and have 20 mm or larger in bending deflection amount measured in accordance with the method described in Japanese Industrial Standards (JIS) K7221-2:2006 and 2 to 100 N in load when deflected by 20 mm, are fixed on a periphery of the opening portion or the seat frame 7, or integrally formed with the periphery of the opening portion, by one-point support or multiple-point support in a direction in which the supporting bodies 3 are bridged between edges forming the opening portion and opposite to each other, a constituent body having a form in which the supporting bodies 3 are aligned with a predetermined interval serves as the seat back pad 2, and the interspace portion 5 allowing bending deformation of the supporting bodies 3 to a rear side of the supporting bodies 3 is provided.

Figure 2:
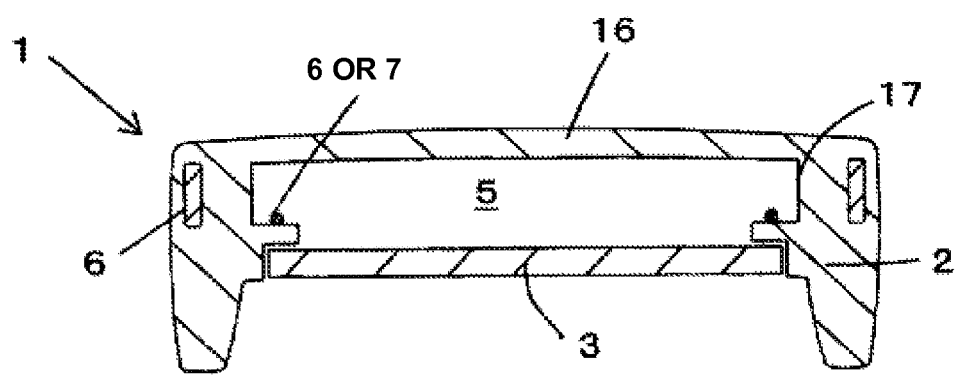
FIG. 2 depicts a cross-sectional schematic view taken from B-B of FIG. 1 in an embodiment where a plurality of supporting bodies are separated.
Figure 5:
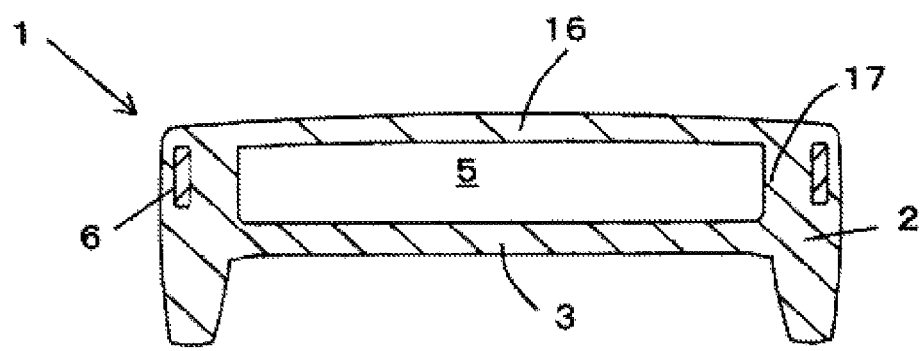
FIG. 5 depicts a cross-sectional schematic view taken from B-B of FIG. 1 in an embodiment where a plurality of supporting bodies are formed integrally.

The supporting body 3 is fixed at or integrally formed with a position corresponding to the front surface portion 15 of the seat back pad 2, as illustrated in FIG. 2 or FIG. 5. The supporting body 3 is included in the components of the seat back pad 2, and constitutes the backrest surface of the seat back pad 2.

When the supporting body 3 is integrally formed with the periphery of the opening portion, there is a form in which the seat back pad 2 is made of a synthetic resin foam, and constituted by sections including the front surface portion 15 on which a backrest surface for a seated person is formed, the side surface portions 17, and the rear surface portion 16 forming a rear side, in which the plurality of slender gaps 4 in a substantially horizontal direction that penetrate through the front surface portion 15 on which the backrest surface is formed are formed, the gaps 4 and the plurality of rod-form or plate-form supporting bodies 3 interposed between the right-side surface portion 17 and the left-side surface portion 17 are aligned with a predetermined interval, the interspace portion 5 allowing bending deformation of the front surface portion 15 is formed in a center portion surrounded by the front surface portion 15, the side surface portions 17, and the rear surface portion 16.

Figure 3:
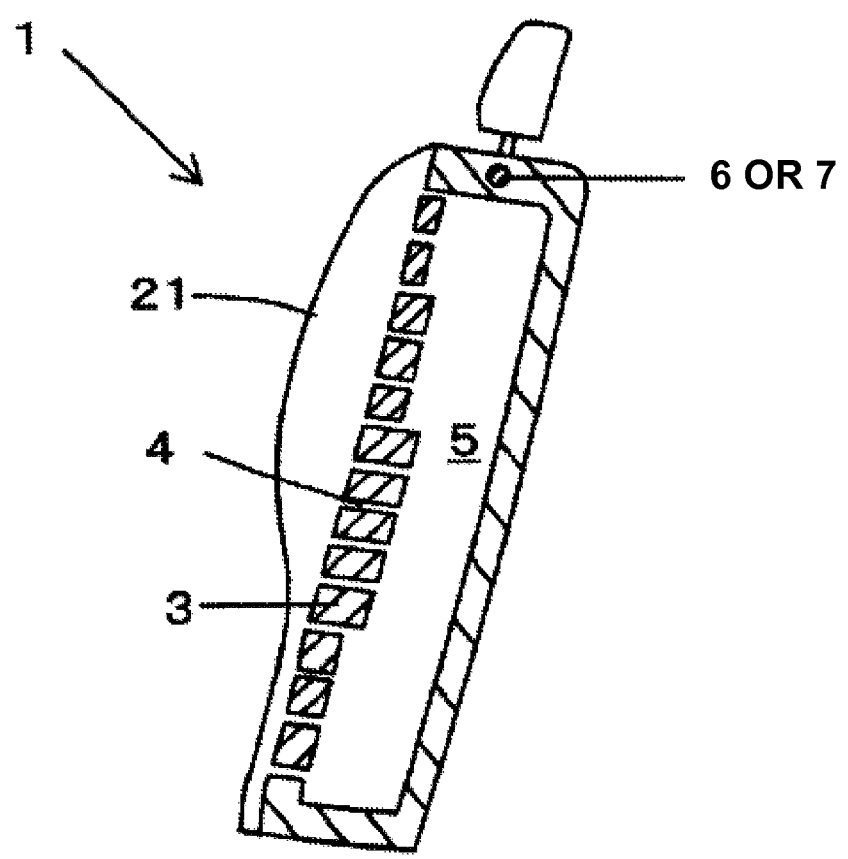
FIG. 3 depicts a cross-sectional schematic view taken from A-A of FIG. 1.
Figure 4:
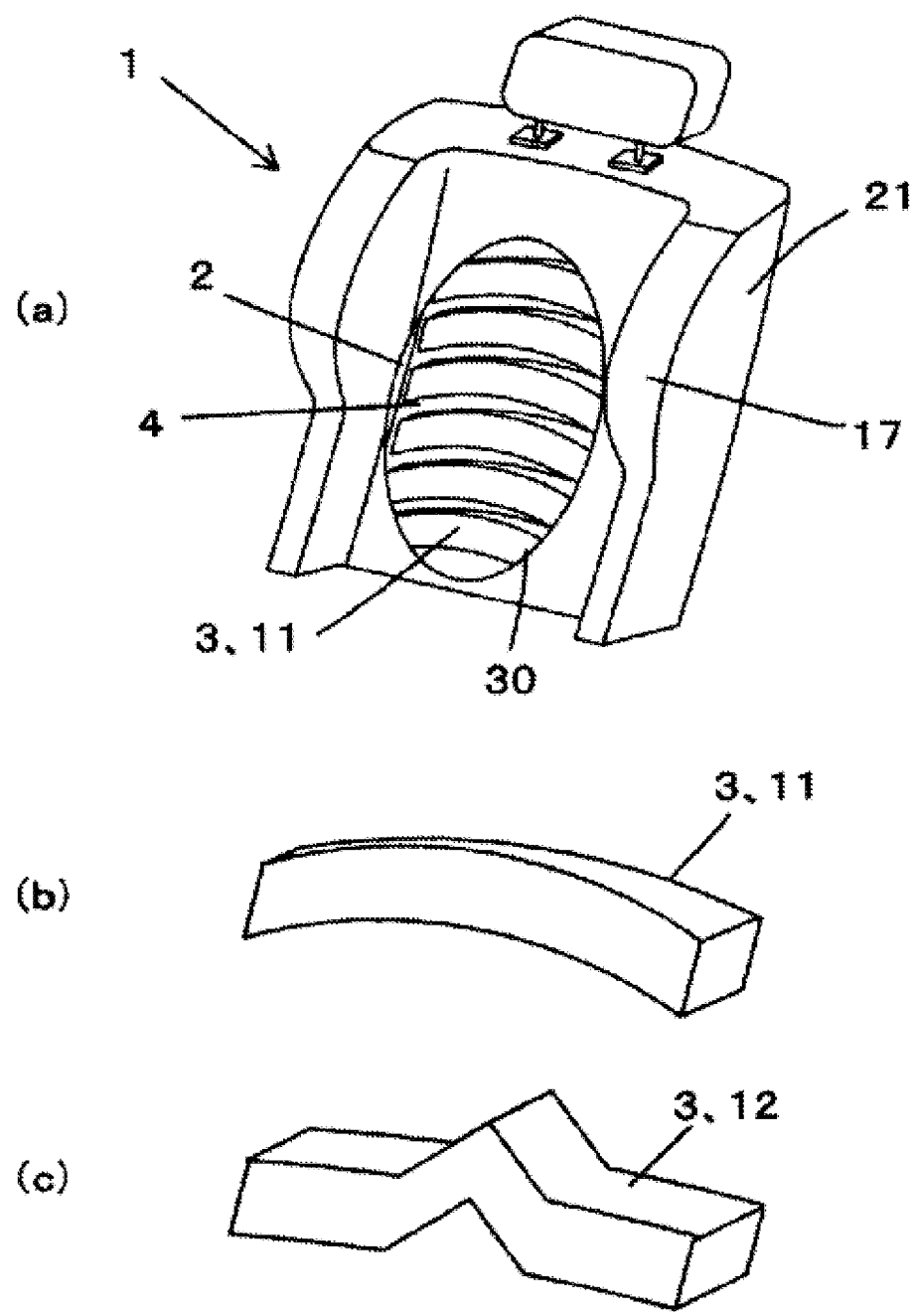
FIG. 4 depicts a schematic view of a seat back for vehicles according to the second aspect of the present invention, in which: (a) depicts a schematic view of a seat back for vehicles; (b) depicts a schematic view of a supporting body having an arc shape; and (c) depicts a schematic view of a supporting body having a bent shape formed by combination of straight lines bent with arbitrary angles.

Then, in the seat back for vehicles 1, at least an outer peripheral surface of the seat back pad 2 is covered with the vehicle seat cover 21, as illustrated in FIG. 1 or FIG. 3.

Figure 10:
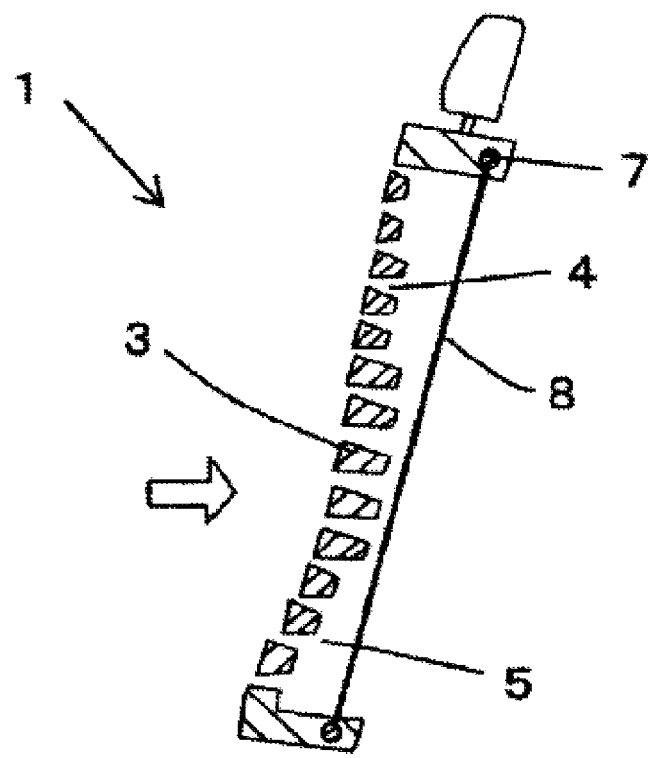
FIG. 10 depicts a vertical cross-sectional schematic view of a seat back for vehicles according to the third aspect of the present invention.

Subsequently, there is described a component with which the plurality of rod-form or plate-form supporting bodies 3 are brought into contact when bending-deformed and deflected to the rear side of the gaps 4 or the interspace portion 5. The component is the belt-form sub-supporting body 8, as illustrated in FIG. 10, or the rear surface portion 16 integrally formed with the right and left-side surface portions 17 of the seat back pad 2, as illustrated in FIG. 2, and FIG. 5 to FIG. 8.

Next, the forms of constituting the interspace portion 5 will be described. There are a form of constituting the interspace portion 5 by being surrounded by the supporting body 3 fixed on the periphery of the opening portion of the seat back pad 2 or on the seat frame 7, the right and left-side surface portions 17, and the rear surface portion 16, as illustrated in FIG. 2, a form of constituting the interspace portion 5 using a synthetic resin foam by being surrounded by the front surface portion 15 on which the backrest surface for a seated person is formed, the right and left-side surface portions 17, and the rear surface portion 16 constituting the rear side, as illustrated in FIG. 5, or a form of constituting the interspace portion 5, in the case of the seat back pad 2 in which the rear surface portion 16 is not provided as illustrated in FIG. 10, by being surrounded by the front surface portion 15 constituted by the plurality of rod-form or plate-form supporting bodies 3, the right and left-side surface portions 17, and the sub-supporting body 8.

Subsequently, the forms of attaching the supporting bodies 3 are described. The supporting bodies 3 are fixed in a vehicle-seat-cover partially-removed range 30 in FIG. 1, or when the seat back pad 2 is separated to the supporting bodies 3 and other sections, as illustrated in FIG. 2, the supporting bodies 3 are fixed, by one-point support, on one side of the facing periphery of the opening portion provided at the front surface portion 15 of the seat back pad 2, or fixed, by multiple-point support, on both sides of the facing periphery of the opening portion. Furthermore, when the seat back pad 2 is integrally formed without separating the supporting bodies 3 from other sections, as illustrated in FIG. 5, the supporting bodies 3 are integrally formed with the periphery of the opening portion of the seat back pad 2 by one-point support or multiple-point support. It is preferable that the seat frame 7 or a wire 6 is disposed on the rear side of the periphery on which the supporting body 3 is fixed to provide rigidity to the periphery on which the supporting body 3 is fixed so as to be a supporting point when the supporting body 3 is deflected.

The supporting bodies 3 are disposed independently with predetermined space from each other so that the adjacent supporting bodies 3 are not influenced by each other due to their contact and so that each supporting body 3 can be individually bending-deformed in a different manner.

Each supporting body 3 is independent by the gaps 4 (space) not to be influenced by other supporting bodies 3. Thus, it is easy to provide completely different bending properties to each of the supporting bodies 3, which improves the degree of freedom of design. Therefore, it is possible to provide high cushioning properties and fitting feeling to the seat back and secure higher comfort. Consequently, when a load is applied on the seat back by an occupant, each section of the supporting bodies 3 with which a body is brought into contact can be different in bending amount desirable to obtain fitting feeling depending on a degree of the load in accordance with body pressure distribution.

With the seat back structure described in Patent Document 2, it is difficult to obtain a certain deflection amount or larger, to obtain desirable cushioning properties and deflection amount that are different depending on sections, and to provide followability for keeping a body at a desirable position even when acceleration is applied on the body of an occupant due to movement of a vehicle. However, the seat back structure according to the present invention can solve these problems easily because the flexible supporting bodies 3 can operate independently.

Next, the gap 4 (space) provided between the supporting bodies 3 will be described. The gap 4 preferably has a width of 2 mm or larger but not exceeding 15 mm. The width of a single gap 4 may be equal or partially variable depending on sections. When the width of the gap 4 is within the above range, it is possible to suppress, when the supporting bodies 3 having received a load of a body of an occupant is bending-deformed, occurrence of low grade noise and blocking of bending deformation that are caused by mutual friction of the supporting bodies 3 arranged adjacent to each other, and to further suppress concave and convex feeling of the supporting bodies 3 and the gaps 4 when seated.

Figure 6:
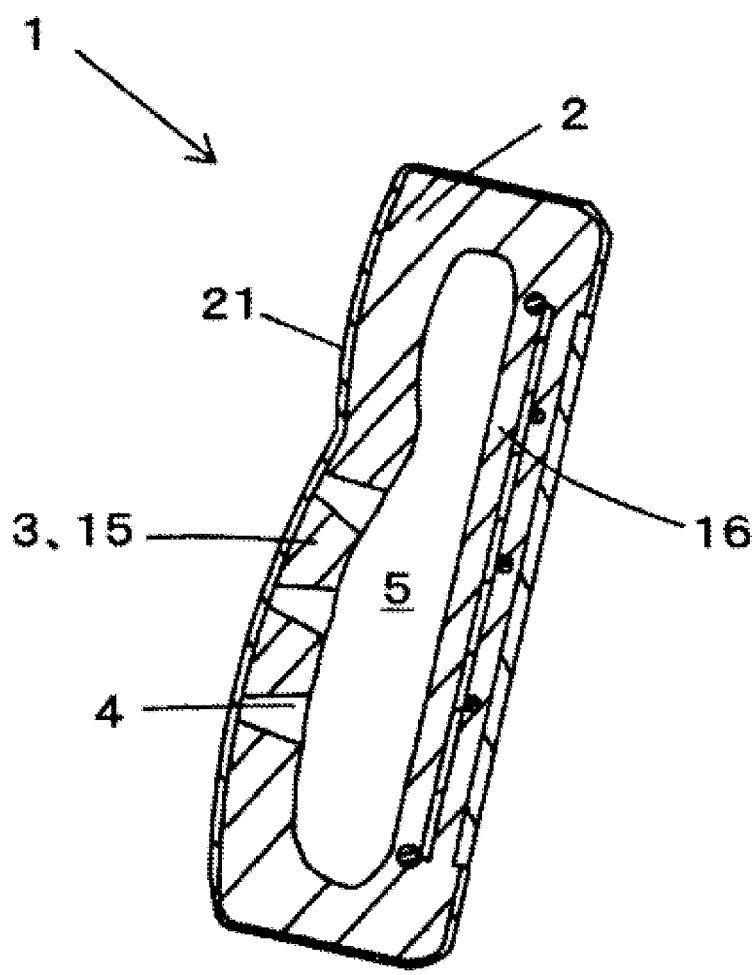
FIG. 6 depicts a vertical cross-sectional schematic view of a seat back for vehicles according to the fourth aspect of the present invention.
Figure 7:
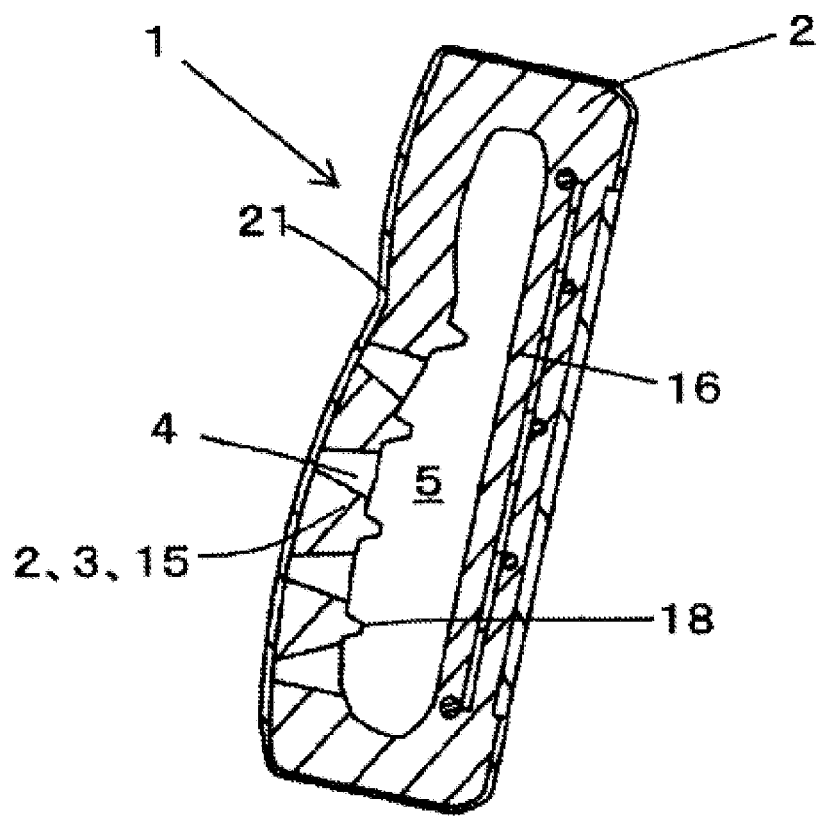
FIG. 7 depicts a vertical cross-sectional schematic view of a seat back for vehicles in an embodiment projecting portions are provided on a plurality of supporting bodies according to the fifth aspect of the present invention.
Figure 8:
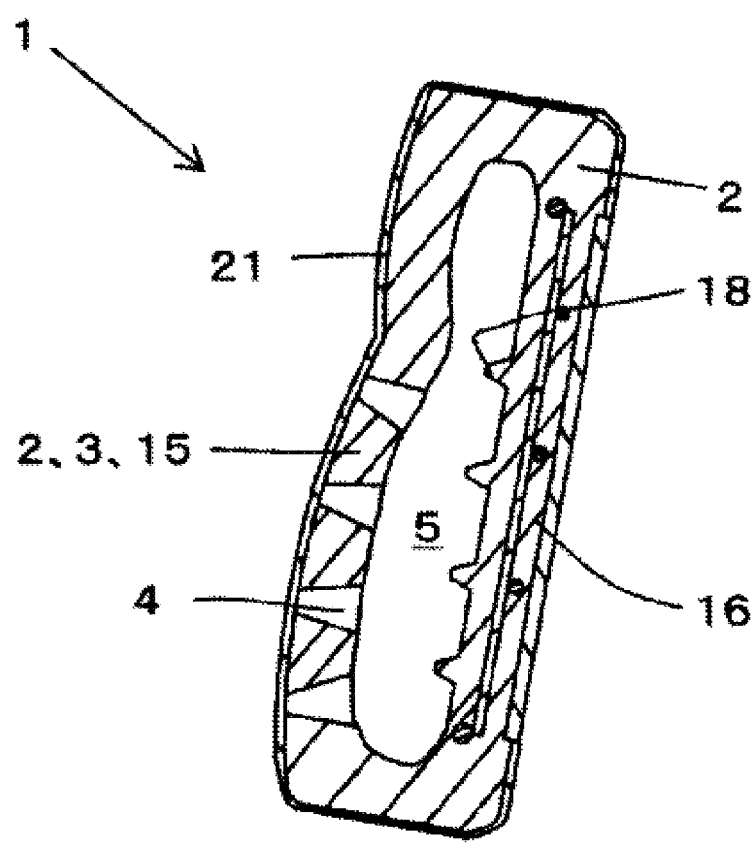
FIG. 8 depicts a vertical cross-sectional schematic view of a seat back for vehicles in an embodiment where projecting portions are provided on a rear surface portion according to the fifth aspect of the present invention.

Furthermore, it is preferable to design the width of the gap 4 (space between supporting bodies 3) to be narrower on the surface side of the seat back and wider on the rear side thereof, as illustrated in FIG. 6 to FIG. 8. It is because when acceleration is applied on an occupant due to movement of a vehicle in front-rear and right-left directions and the supporting bodies 3 are three-dimensionally deformed with this in a complicated manner, the mutual contact can be prevented.

Next, the supporting body 3 will be described. The form of the supporting body 3 in front view may be a linear shape or a curved shape in any direction within 360° including a horizontal, vertical, or diagonal direction, or a bent shape formed by combination of straight lines bent with arbitrary angles. When the width (front-rear direction) of the seat back is sufficiently large, it is possible to increase bending deflection (indicating the limit to which the supporting body 3 can be bent and deflected in accordance with the degree of pressure of an occupant) of the supporting body 3 even when the form of the supporting body 3 is linear. When the width of the seat back is small, it is difficult to increase bending deflection of the supporting body 3. Then, when it is difficult to secure a spans satisfactory for the supporting body 3 due to limit of the width (front-rear direction) of the seat back on the design of the seat back for vehicles 1, and it is necessary to further increase bending deflection of the supporting body 3, the form of the supporting body 3 in front view is deformed to an arc shape, or a bent shape formed by combination of straight lines bent with arbitrary angles, as illustrated in (a) to (c) of FIG. 4, whereby it is possible to increase the substantial length of the supporting body 3 to be bent and effectively obtain necessary deflection.

Next, the section shape of the supporting body 3 can be an arbitrary shape such as a rectangular shape, a round-bar shape, and an ellipse shape, for example. Note that in order to avoid concentration of stress in bending deformation, a corner portion preferably has a shape not including an acute angle portion.

The size of each supporting body 3, that is, a width, a thickness, and a length thereof, and a shape thereof are designed depending on optimal cushioning properties and bending amount determined by rigidity of a synthetic resin foam to be used, shapes of portions of a body portions of an assumed occupant, and a seat position, for example. As the concrete size, the width of the supporting body 3 in a vertical direction is preferably 12 mm or larger but not exceeding 200 mm. The thickness in a front-rear direction is 10 mm or larger but not exceeding 60 mm. The followability to a body shape is increased as the width of the supporting body 3 is smaller. However, the width is preferable to be within the above range from the point of view of balance between durability and cushioning properties or fitting feeling of the supporting body 3. The length of the supporting body 3 is determined arbitrarily depending on the size of a body of an assumed occupant, the size of a seat, or the supporting form of the supporting body 3, for example.

Next, there is described the projecting portion 18 projecting to the side of the interspace portion 5 that is on the rear side of the rod-form or plate-form supporting body 3 interposed in a substantially horizontal direction between the right and left-side surface portions 17 in the seat back pad 2 of the seat back for vehicles 1, as illustrated in FIG. 7, or the projecting portion 18 projecting to the side of the interspace portion 5 on the rear surface portion 16 of the seat back pad 2, as illustrated in FIG. 8.

The projecting portion 18 indicates a projection or a projecting line having a flat, concave, or convex tip portion shape, characterized in that after the rod-form or plate-form supporting body 3 has deflection by a certain amount or larger due to pressure of a seated person, the projecting portion 18 projects on the supporting body 3 corresponding to the front surface portion 15 of the seat back pad 2 or on the rear surface portion 16 of the seat back pad 2, and is compression-deformed relative to pressure after contact with the facing rear surface portion 16 or the supporting body 3 of the seat back pad 2. Then, the vertical section shape or the horizontal section shape of the projection or the projecting line having a flat, concave, or convex tip portion shape is a substantially triangular shape, a tapered shape, or a tip branched shape having a plurality of tapered shape portions. The tip portion shape of the projection or the projecting line is a sharp shape in which the tip portion is pointed, a round shape in which the tip portion has roundness, or an obtuse tip shape in which the tip portion is tapered and has a flat portion.

When the rod-form or plate-form supporting body 3 corresponding to the front surface portion 15 of the seat back pad 2 is bending-deformed in a rear direction due to pressure of a seated person, and the bending deformation amount becomes a certain amount or larger, the projecting portion 18 projecting on the supporting body 3 or the rear surface portion 16 is brought into contact with the facing rear surface portion 16 or rear side of the supporting body 3. After the contact, the supporting body 3 and the rear surface portion 16 connected by the projecting portion 18 support together the seated person, which can suppress excessive sinking of the body. In the seat back for vehicles 1, the characteristic required to prevent tiredness due to long-time riding is the increase of hardness of the cushion material of a part supporting a waist of a seated person to keep the seated person at a predetermined portion, for example. When the seat back for vehicles 1 according to the present invention is used, in addition to reaction force of the rod-form or plate-form supporting body 3 made of a synthetic resin foam when bending-deformed, the projecting portion 18 connects, with deformation by a certain amount or larger, the supporting body 3 and the rear surface portion 16 and, after the connection, the supporting body 3 and the projecting portion 18 are compression-deformed between the seated person and the rear surface portion 16 having rigidity, thus gradually increasing hardness of the seat back. Therefore, it is possible to support the body of the seated person more securely.

Furthermore, it is more preferable that the projecting portion 18 has an acute tip shape. This reduces rapid increase of reaction occurring after the contact of the projecting portion 18 and the rear surface portion 16, which can reduce bottom butting feeling of the occupant.

Figure 9:
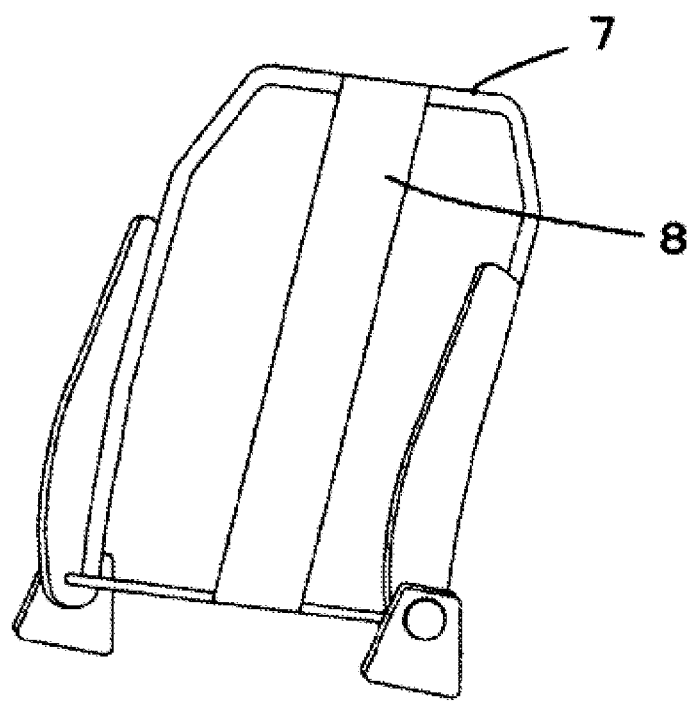
FIG. 9 depicts a schematic view of a sub-supporting body according to the third aspect of the present invention.

Next, there is described the belt-form sub-supporting body 8 extended between the both ends of the seat frame 7 of the seat back, as illustrated in FIG. 9. It is preferable that the sub-supporting body 8 is obtained by spinning and weaving, with high density, synthetic fiber such as polyester, for example, and is small in elongation, or high in restoration properties although it has certain elasticity.

FIG. 10 illustrates movement of the seat back when the belt-form sub-supporting body 8 is used. The supporting bodies 3 having received pressure by a seated person are bending-deformed in a rear direction. However, after the bending deformation becomes a certain amount or larger, the rear side of the supporting bodies 3 are in contact with the sub-supporting body 8 extended on the seat frame 7, which suppresses excessive sinking of the body and supports, after the contact, the body of the seated person by reaction force due to bending deformation of the supporting bodies 3 and tension of the sub-supporting body 8.

Figure 16:
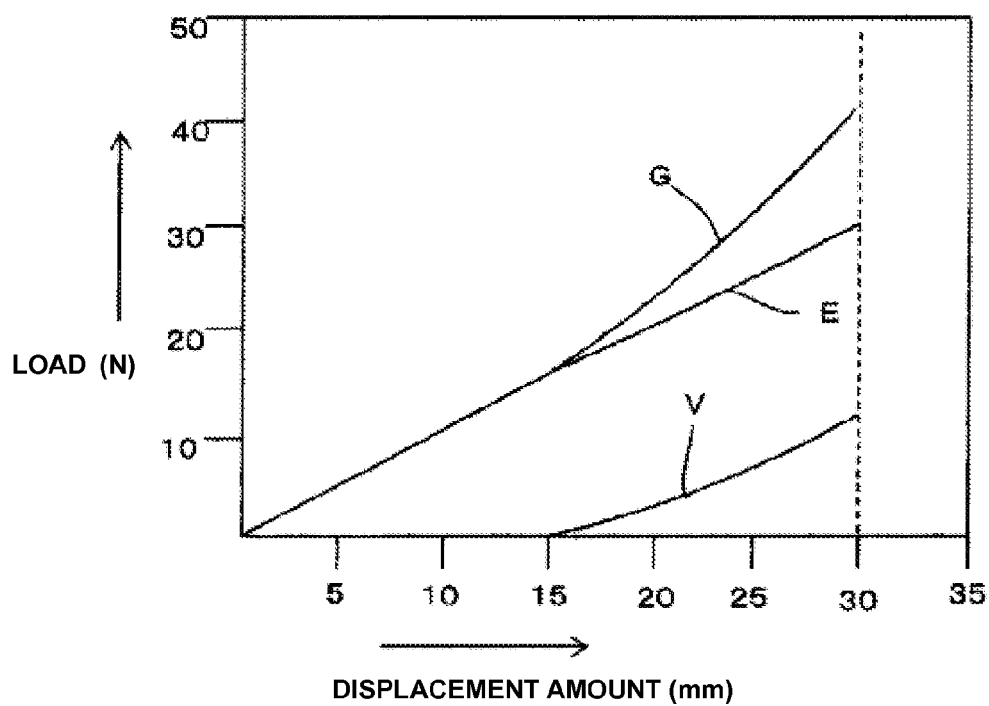
FIG. 16 depicts a compression-displacement amount diagram in a structure according to the third aspect of the invention.

FIG. 16 illustrates an example in which a test specimen having the configuration according to the present invention is actually pressed by a testing machine. FIG. 16 illustrates reaction force occurred when the surface of the seat back is pressed by 30 mm using a hemispherical tool with a diameter of 100 mm at a speed of 100 mm/min. The lowest line V indicates reaction force when only the belt that is the sub-supporting body 8 is pressed, the central line E indicates reaction force when only the supporting bodes 3 made of a synthetic resin foam are pressed, and the highest line G indicates reaction force when the test specimen having the configuration according to the present invention is pressed.

In the test specimen having the configuration according to the present invention, the belt that is the sub-supporting body 8 is provided at a position 15 mm behind the supporting bodies 3 made of a synthetic resin foam. Thus, the supporting bodies 3 as a single component that are made of a synthetic resin foam and the test specimen having the configuration according to the present invention generate exactly same reaction force until being pressed by 15 mm with the test tool. Thereafter, the supporting bodies 3 made of a synthetic resin foam are brought into contact with the belt-form sub-supporting body 8, and then reaction force occurred by each of the supporting body 3 made of a synthetic resin foam and the belt-form sub-supporting body 8 is mixed, increasing rigidity gradually.

Subsequently, the synthetic resin foam will be described. The synthetic resin foam according to the present invention indicates a synthetic resin foam molding that is flexible to be bending-deformed and excellent in restoration properties. The bending deflection thereof measured in accordance with the method described in JIS K7221-2:2006 (in the atmosphere of 23±2° C. and relative humidity of 50±5%, a test specimen whose skin is removed having a length of 350 mm, a width of 100 mm, and a thickness of 25 mm is subjected to a load applied at a test speed 20±1 mm/min with a distance between supporting points of 300 mm until the deflection reaches 90 mm at maximum, and the load deflection curve is recorded) is 20 mm or larger, and the load when deflected by 20 mm is 2 to 100 N. The synthetic resin foam molding having breakage with bending deflection of smaller than 20 mm is inappropriate from the aspect of durability. When the cross section of the supporting body 3 necessary to support pressure of a body is significantly large and the load when deflected by 20 mm exceeds 100 N, it is difficult to generate a preferable deflection amount and achieve preferable design. To be more specific, the synthetic resin foam according to the present invention indicates a polypropylene foam, a polyethylene foam, and other polyolefin resin foams, or a modified polystyrene resin foam, for example. Among the above foams, the in-mold molding of resin foam particles is preferable from the aspect of the degree of freedom of form (easiness in design) considering fitting feeling.

The polyolefin resin constituting foam particles used according to the present invention is a polyolefin resin having olefin component units as a main component. Concretely, it is exemplified by polypropylene resin, polyethylene resin, and a mixture of such two kinds or more, for example. Note that the above "as a main component" indicates that 50 mass % or more of olefin component units is contained in the polyolefin resin. The contained amount is preferable to be 75 mass % or more, more preferable to be 85 mass % or more, and still more preferable to be 90 mass % or more.

The polypropylene resin is exemplified by resin containing 50 mass % or more of propylene component unit, and is propylene homopolymer, or copolymer with other olefin that is copolymerizable with propylene, for example. Other olefin that is copolymerizable with propylene is exemplified by 4-10C α-olefin such as ethylene, 1-butene, isobutylene, 1-pentene, 3-methyl-1-butene, 1-hexene, 3,4-dimethyl-1-butene, 1-heptene, and 3-methyl-1-hexene, for example. The above-described copolymer may be random copolymer or block copolymer, and further may be not only binary copolymer but also ternary copolymer. Note that other olefin that is copolymerizable with propylene in the above-described copolymer is preferably contained at a ratio of 25 mass % or less, and particularly 15 mass % or less. The lower limit value is preferably 0.3 mass %. Furthermore, such polypropylene resin can be used individually or as a mixture of two kinds or more. The polypropylene resin is desirable to be a resin foam obtained by foaming of base resin having 600 MPa or higher in value of a tensile elastic modulus (E) defined in JIS K7161:1994 (test specimen: test specimen 1A described in JIS K7162 (1994) (molded directly by injection molding), test speed: 1 mm/min).

The polyethylene resin is exemplified by resin containing 50 mass % or more of ethylene component units, and is high density polyethylene, low density polyethylene, linear low density polyethylene, ethylene-vinyl acetate copolymer, ethylene-propylene copolymer, ethylene-propylene-butene 1 copolymer, ethylene-butene 1 copolymer, ethylene-hexene 1 copolymer, ethylene-4 methylpentene 1 copolymer, and ethylene-octene 1 copolymer, for example, and a mixture of two kinds or more of them.

Then, regarding the concrete selection of the synthetic resin foam, when a rod-form test specimen having a length of approximately 400 mm is further held at the both ends thereof and kept for 30 minutes after the center of the test specimen is pressed down about 25 mm, and then the load is released, the material preferably has restoration from deformation of the sample by 90% or higher. Alternatively, when the center portion of the sample held at the both ends thereof is pressed down repetitively a predetermined number of times and deformed, in accordance with the test conventionally performed for the seat back made of an urethane foam, the material preferably has residual distortion measured thereafter of a predetermined amount or smaller. The predetermined number of times and the predetermined amount are in accordance with specifications arbitrarily defined when vehicle manufacturers conventionally select materials.

As material fulfilling such conditions, a polypropylene foam with density of 0.06 to 0.015 g/cm$^3$, and more preferably with density of 0.035 to 0.015 g/cm$^3$, or a polyethylene foam with density of 0.08 to 0.03 g/cm$^3$ are preferable, for example. Such materials have a load when deflected by 20 mm of 2 to 100 N in the test performed in accordance with the method described in JIS K7221-2:2006 (in the atmosphere of 23±2° C. and relative humidity of 50±5%, a test specimen whose skin is removed having a length of 350 mm, a width of 100 mm, and a thickness of 25 mm is subjected to a load applied at a test speed 20±1 mm/min with a distance between supporting points of 300 mm until the deflection reaches 90 mm at the maximum, and the load deflection curve is recorded), and is excellent in bending rigidity as well as flexibility relative to bending. By contrast, the flexible urethane foam used generally and conventionally is significantly inferior with bending rigidity of 0.46 N, and thus is not appropriate as material constituting the seat back according to the present invention.

In the following, creep properties and bending rigidity when the synthetic resin foam is used will be described. First, permanent compression set in accordance with JIS K6767:1999 was measured to evaluate creep properties. The test specimen having a length of 50 mm, a width of 50 mm, and a thickness of 25 mm is compressed to the state in which it is distorted by 25%, and left for 22 hours in a temperature of 23±2° C. The thickness after 24 hours from the finish of compression is measured. The permanent compression set was calculated by permanent compression set (%)=(original thickness of test specimen (mm)−thickness after 24 hours from finish of compression (mm))/original thickness of test specimen (mm)×100.

As a result, the permanent compression set of 45 times polypropylene foam particle molding is 11%. By contrast, the permanent compression set of a polyurethane foam by the same measurement method is 2% or smaller. This indicates that when the urethane foam, which is generally and conventionally used as a cushion material for a seat back and exerts cushioning properties by compression deformation, is simply substituted by a synthetic resin foam, permanent compression set occurs, making it difficult to keep original cushioning properties and thus deteriorating marketability.

Figure 11:
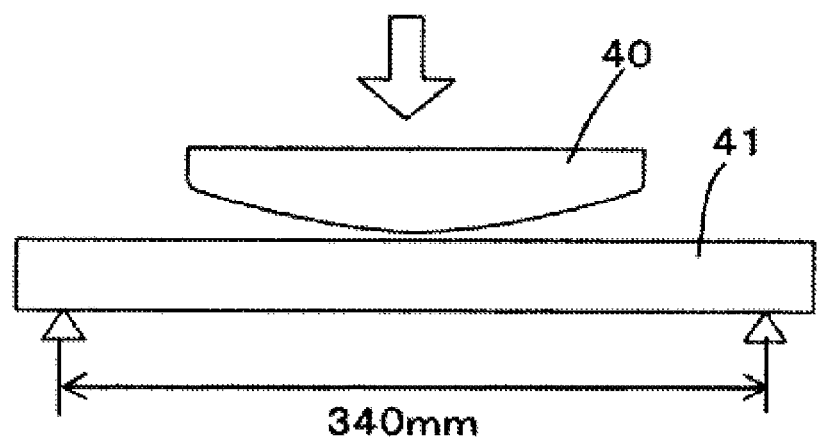
FIG. 11 depicts a schematic view of load durability test.
Figure 13:
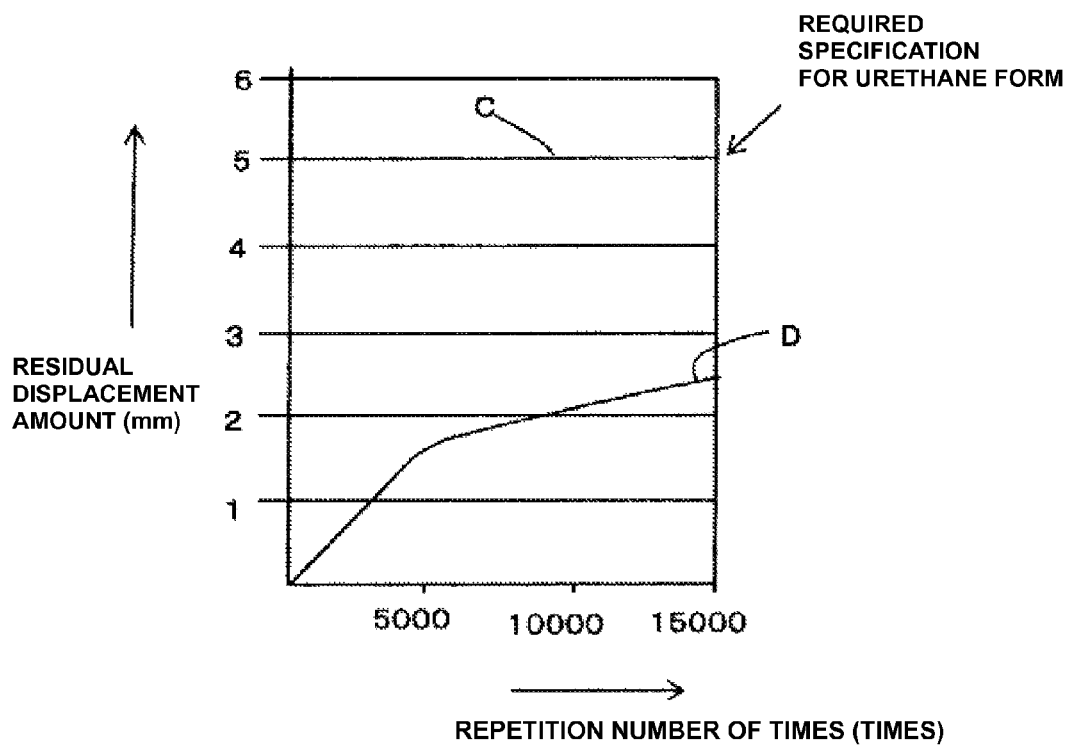
FIG. 13 depicts a diagram of a residual displacement amount due to repetition loads.

Next, a residual displacement amount after a sample plate 41 was pressed with a load of 490 N repetitively 5,000 times, 10,000 times, and 15,000 times in a normal temperature using a back-shape pressing tool 40 (oval shape in plane view, length of 440 mm in right and left direction, depth (width) of 290 mm, height of 60 mm in front view) was measured as a load durability test. Note that in order to investigate a residual displacement amount when the synthetic resin foam is bending-deformed, the flat sample plate 41 that is a polypropylene foam 45 times foam and has a thickness of 20 mm and a width (depth) of 600 mm was held at both ends thereof with 340 mm of space therebetween and used, as illustrated in FIG. 11. FIG. 13 illustrates the result of the load durability test.

FIG. 13 illustrates that the specification required for the conventional urethane foam is 5 mm or smaller (line C in FIG. 13) in residual displacement amount, while the residual displacement amount in the case of the synthetic resin foam according to the present invention (line D in FIG. 13) is 2.5 mm, which is within a range of the specification.

Therefore, FIG. 13 illustrates that when the deflection due to bending deformation and restoration properties of the synthetic resin foam that can be bending-deformed and is excellent in restoration properties are used as a cushion material, the synthetic resin foam has creep resistance properties equivalent to or superior to those of the urethane foam used conventionally.

The synthetic resin foam is superior to the urethane foam in creep resistance properties. It is because when the synthetic resin foam is used as the supporting body 3, and the center portion is pressed down to be bending-deformed, stretching, compression, and shearing, for example, are applied to each portion of the members to be deformed, but the degree of each deformation is smaller as compared with a direct deformation amount when the members are used as a cushion material by simply compressing them in a conventional manner, remaining within an elastic area in which restoration properties are not deteriorated.

Figure 12:
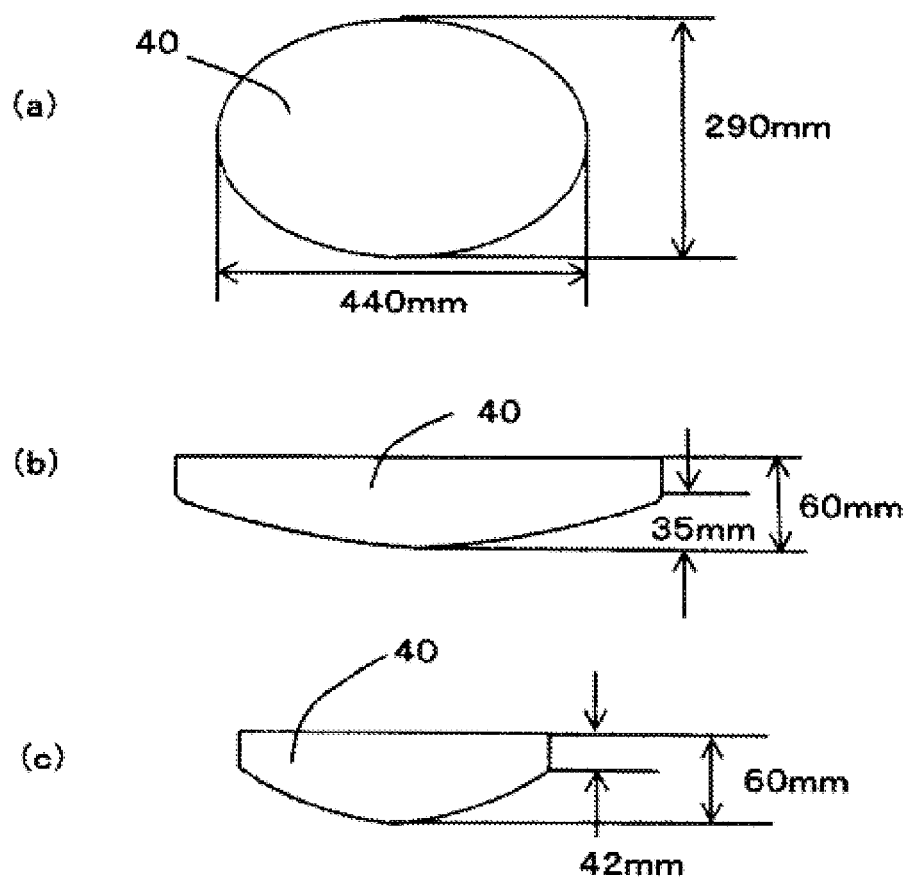
FIG. 12 depicts a schematic view of a back-shape pressing tool, in which: (a) depicts a plan view; (b) depicts a front view; and (c) depicts a side view.
Figure 14:
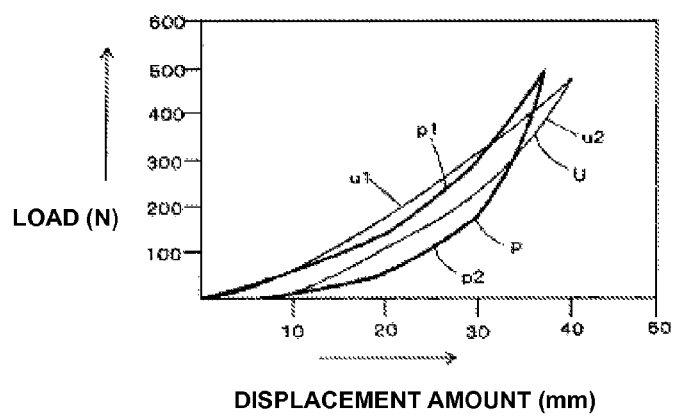
FIG. 14 depicts a load-displacement amount diagram with a seat back form.

Next, FIG. 14 is an example comparing reaction force occurred when the seat back form test specimen using the supporting bodies 3 made of a synthetic resin foam and the seat back form test specimen using an urethane foam having a conventional structure, which are held at both ends thereof, are pressed at a compression speed of 100 mm/min using the back-shape processing tool 40 as illustrated in FIG. 12. The size of the test specimen using an urethane foam is 650 mm in width, 350 mm in length, and 100 mm in thickness. The test specimen using a synthetic resin foam has a form in which a plurality of polypropylene foam 45 foams having a length of 350 mm, a width of 50 mm, and a thickness of 30 mm are aligned with space of 2 mm. A fine line U illustrated in FIG. 14 is a load-displacement amount diagram of the urethane foam generally used for a seat back, and prepared for comparison. A bold line P is a load-displacement amount diagram when the center of the supporting body 3 made of the synthetic resin foam according to the present invention is pressed and bent. Furthermore, the load-displacement amount diagram when pressed down is illustrated with u1 and p1, and the load-displacement amount when released after pressed down is illustrated with u2 and p2.

FIG. 14 illustrates that even with the supporting body 3 made of a synthetic resin foam that is relatively hard, when the configuration is such that cushioning properties are obtained by bending deformation, it is possible to obtain flexibility nearly same as that of the conventional urethane foam.

Figure 15:
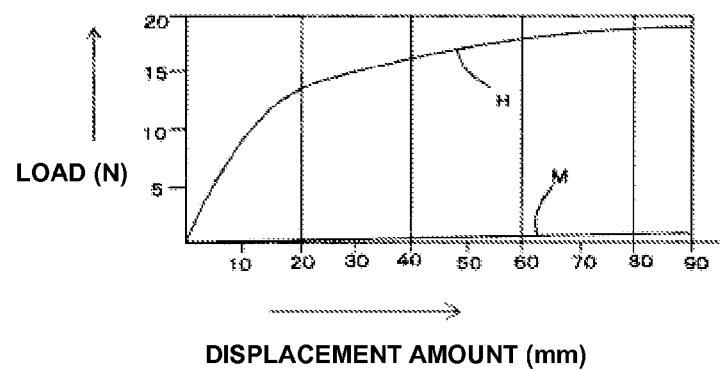
FIG. 15 depicts a comparison diagram between a foam and a non-foam in bending test in accordance with JIS K7221-2.

Next, FIG. 15 is a load-displacement amount diagram when the polypropylene foam is selected as an example of a synthetic resin foam, and a sample of a non-foaming resin plate (thickness of 1 mm) and a sample of a foaming polypropylene foam 45 times foam (thickness of 45 mm), which are made of same resin, are supported at both ends thereof, and the center portions thereof are pressed down, in accordance with JIS K7221-2:2006 (in the atmosphere of 23±2° C. and relative humidity of 50±5%, a test specimen whose skin is removed having a length of 350 mm, a width of 25 mm, a same sample weight, and an arbitrary thickness is subjected to a load applied at a test speed 20±1 mm/min with a distance between supporting points of 300 mm until the deflection reaches 90 mm at the maximum, and the load deflection curve is recorded). The width was made constant to 25 mm, and the thickness was adjusted so that the weight of the samples is same. The case of the non-foaming resin plate is illustrated with a load-displacement amount diagram M, and the case of the sample made of the polypropylene foam 45 times foam is illustrated with a load-displacement amount diagram H.

FIG. 15 illustrates that although the weight of both samples is equal, the bending rigidity is significantly increased when the foam is adopted. Conventionally, it is not general to use a foam as a cushion material by bending-deforming it. However, it is indicated that the use of the foam can decrease the weight of parts necessary to obtain same bending rigidity, that is, the use of the foam enables light weighting of the seat back for vehicles 1.

REFERENCE NUMERALS

1 seat back for vehicles
2 seat back pad
3 supporting body
4 gap
5 interspace portion
6 wire
7 seat frame
8 sub-supporting body
11 supporting body
12 supporting body
15 front surface portion
16 rear surface portion
17 side surface portion
18 projecting portion
21 vehicle seat cover
30 vehicle-seat-cover partially-removed range
40 pressing tool
41 sample plate

What is claimed is:

1. A seat back for vehicles comprising: a seat back pad, the seat back pad having
   a plurality of supporting bodies fixed on a periphery of an opening of the seat back pad by one-point support or multiple-point support, or formed integrally with the periphery of the opening by one-point support or multiple-point support, wherein
   the plurality of supporting bodies are aligned at predetermined intervals, and each of the plurality of supporting bodies is arranged in a direction between periphery portions opposite to each other of the periphery of the opening on the seat back pad at a front surface portion thereof formed as a backrest surface for a seated person, and wherein
   the plurality of supporting bodies are independent of each other, either as rods or as plates, in a substantially horizontal direction between the periphery portions opposite to each other, and each of the plurality of supporting bodies is made of a synthetic resin foam having larger than or equal to 20 mm in bending deflection amount and 2 to 100 N in load when deflected by 20 mm on a load deflection curve, both of which are measured in accordance with a bending deflection method defined by JIS K7221-2:2006, and
   an interspace portion formed between the front surface portion and a rear surface portion spaced from a rear side of the front surface portion, the interspace portion configured such that the plurality of supporting bodies are allowed to be deformed by bending in a rear direction into the interspace portion, and wherein the periphery portions of the seat back pad consist of a synthetic resin foam.

2. The seat back for vehicles according to claim 1, wherein the plurality of supporting bodies have, in front view, a linear shape, a curved shape, or a bent shape formed by combination of straight line strips adjacent to each other, and bent relative to each other at arbitrary angles.

3. The seat back for vehicles according to claim 2, wherein the seat back pad further has a belt-form sub-supporting body extended on the seat frame on a rear side of the plurality of supporting bodies.

4. The seat back for vehicles according to claim 1, wherein the seat back pad further has a belt-form sub-supporting body extended on the seat frame on a rear side of the plurality of supporting bodies.

* * * * *